United States Patent
Medi et al.

(10) Patent No.: US 9,684,639 B2
(45) Date of Patent: Jun. 20, 2017

(54) EFFICIENT VALIDATION OF BINARY XML DATA

(75) Inventors: Vijay Medi, Sunnyvale, CA (US); Sam Idicula, Santa Clara, CA (US); Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/533,722

(22) Filed: Jun. 26, 2012

(65) Prior Publication Data

US 2012/0272137 A1    Oct. 25, 2012

Related U.S. Application Data

(63) Continuation of application No. 12/689,196, filed on Jan. 18, 2010, now Pat. No. 8,255,372.

(51) Int. Cl.
| | |
|---|---|
| *G06F 17/00* | (2006.01) |
| *G06F 17/22* | (2006.01) |
| *G06F 17/27* | (2006.01) |
| *G06F 17/30* | (2006.01) |

(52) U.S. Cl.
CPC ...... *G06F 17/2252* (2013.01); *G06F 17/2247* (2013.01); *G06F 17/2725* (2013.01); *G06F 17/30917* (2013.01)

(58) Field of Classification Search
CPC ......... G06F 17/30315; G06F 17/30445; G06F 17/30501; G06F 8/51; G06F 17/2247; G06F 17/2252; G06F 17/2725; G06F 17/30917
USPC ......................................... 717/136; 709/230
See application file for complete search history.

(56) References Cited

U.S. PATENT DOCUMENTS

| | | | |
|---|---|---|---|
| 6,018,747 | A | 1/2000 | Burns et al. |
| 6,061,697 | A | 5/2000 | Nakao |
| 6,414,610 | B1 | 7/2002 | Smith |
| 6,598,055 | B1 | 7/2003 | Keesey et al. |

(Continued)

FOREIGN PATENT DOCUMENTS

| | | |
|---|---|---|
| WO | WO 03/107576 | 12/2003 |
| WO | WO 03107576 | 12/2003 |
| WO | WO 2006026534 | 3/2006 |

OTHER PUBLICATIONS

U.S. Appl. No. 11/437,512, filed May 18, 2006, Advisory Action, May 10, 2013.

(Continued)

*Primary Examiner* — Ann J Lo
(74) *Attorney, Agent, or Firm* — Hickman Palermo Becker Bingham LLP (57) ABSTRACT

Data used and generated by the process of validating XML documents is divided into two categories: compile-time static data and runtime data. Runtime data may be specific to a particular XML document and changes when validating the XML document, while compile-time data does not change in this way. For example, compile-time data may be data that defines, according to a schema, the descendant elements and ordering between them. Runtime data is information generated to track which descendants occurred in a particular XML document being validated. Compile-time static data, once generated to validate a particular XML document, is cached within a shared volatile memory. Once the compile-time data is cached, the compile-time static data may be used to validate other XML documents without the need to regenerate the compile-time static data.

10 Claims, 3 Drawing Sheets

(56) References Cited

U.S. PATENT DOCUMENTS

| | | |
|---|---|---|
| 6,643,650 B1 | 11/2003 | Slaughter et al. |
| 6,655,593 B2 | 12/2003 | Alleshouse |
| 6,671,853 B1 | 12/2003 | Burkett et al. |
| 6,772,413 B2 | 8/2004 | Kuznetsov |
| 6,879,986 B1 | 4/2005 | Fisher |
| 6,883,137 B1 | 4/2005 | Girardot et al. |
| 6,941,510 B1 | 9/2005 | Ozzie et al. |
| 6,964,015 B2 | 11/2005 | Demopoulos et al. |
| 6,996,571 B2 | 2/2006 | McConnell |
| 7,013,425 B2 | 3/2006 | Kataoka |
| 7,031,956 B1 | 4/2006 | Lee et al. |
| 7,080,094 B2 | 7/2006 | Dapp et al. |
| 7,090,318 B2 | 8/2006 | Brown |
| 7,134,072 B1 | 11/2006 | Lovett et al. |
| 7,143,397 B2 | 11/2006 | Imaura |
| 7,260,580 B2 | 8/2007 | Gauweiler |
| 7,302,489 B2 | 11/2007 | Kraft |
| 7,340,673 B2 | 3/2008 | Malone |
| 7,464,082 B2 | 12/2008 | Weiss |
| 7,475,093 B2 | 1/2009 | Tomic et al. |
| 7,484,171 B2 | 1/2009 | Jeon et al. |
| 7,490,093 B2 | 2/2009 | Jain et al. |
| 7,536,676 B2 | 5/2009 | Baker et al. |
| 7,586,839 B2 | 9/2009 | Childress et al. |
| 7,716,577 B2 | 5/2010 | Behrens et al. |
| 7,730,104 B2 | 6/2010 | Uchiyama et al. |
| 7,774,321 B2 | 8/2010 | Tomic et al. |
| 7,779,350 B2 | 8/2010 | Bender et al. |
| 7,831,540 B2 | 11/2010 | Medi et al. |
| 7,844,632 B2 | 11/2010 | Zhou et al. |
| 7,877,356 B1 | 1/2011 | Guiheneuf et al. |
| 8,046,699 B2 | 10/2011 | Mohan et al. |
| 8,073,841 B2 | 12/2011 | Tarachandani et al. |
| 8,150,818 B2 | 4/2012 | Van Der Linden et al. |
| 2001/0037346 A1 | 11/2001 | Johnson |
| 2002/0075514 A1 | 6/2002 | Wright et al. |
| 2002/0111965 A1 | 8/2002 | Kutter |
| 2002/0123993 A1 | 9/2002 | Chau et al. |
| 2002/0184145 A1 | 12/2002 | Sijacic et al. |
| 2003/0018666 A1 | 1/2003 | Chen et al. |
| 2003/0046317 A1 | 3/2003 | Cseri |
| 2003/0069881 A1 | 4/2003 | Huttunen |
| 2003/0093626 A1 | 5/2003 | Fister |
| 2003/0101235 A1 | 5/2003 | Zhang |
| 2003/0159112 A1 | 8/2003 | Fry |
| 2003/0163603 A1 | 8/2003 | Fry et al. |
| 2004/0060006 A1 | 3/2004 | Lindblad et al. |
| 2004/0068509 A1 | 4/2004 | Garden et al. |
| 2004/0068696 A1 | 4/2004 | Seyrat et al. |
| 2004/0073870 A1 | 4/2004 | Fuh et al. |
| 2004/0143791 A1 | 7/2004 | Ito et al. |
| 2004/0148278 A1 | 7/2004 | Milo et al. |
| 2004/0225647 A1 | 11/2004 | Connelly et al. |
| 2004/0267760 A1 | 12/2004 | Brundage et al. |
| 2004/0268244 A1 | 12/2004 | Levanoni et al. |
| 2004/0268305 A1 | 12/2004 | Hogg et al. |
| 2005/0033733 A1 | 2/2005 | Shadmon et al. |
| 2005/0039124 A1 | 2/2005 | Chu et al. |
| 2005/0044113 A1 | 2/2005 | Manikutty et al. |
| 2005/0050054 A1 | 3/2005 | Clark et al. |
| 2005/0050092 A1 | 3/2005 | Jain et al. |
| 2005/0086608 A1 | 4/2005 | Roessler |
| 2005/0091188 A1 | 4/2005 | Pal et al. |
| 2005/0097084 A1 | 5/2005 | Balmin et al. |
| 2005/0108209 A1 | 5/2005 | Beyer et al. |
| 2005/0114316 A1 | 5/2005 | Fontoura et al. |
| 2005/0177543 A1 | 8/2005 | Chen et al. |
| 2005/0187973 A1 | 8/2005 | Brychell et al. |
| 2005/0228786 A1 | 10/2005 | Murthy et al. |
| 2005/0228791 A1 | 10/2005 | Thusoo et al. |
| 2005/0228828 A1 | 10/2005 | Chandrasekar et al. |
| 2005/0278289 A1 | 12/2005 | Gauweiler |
| 2005/0278616 A1 | 12/2005 | Eller |
| 2005/0289125 A1 | 12/2005 | Liu et al. |
| 2005/0289175 A1 | 12/2005 | Krishnaprasad et al. |
| 2006/0021246 A1 | 2/2006 | Schulze et al. |
| 2006/0031757 A9 | 2/2006 | Vincent |
| 2006/0036631 A1 | 2/2006 | Cheslow |
| 2006/0036755 A1 | 2/2006 | Abdullah et al. |
| 2006/0059324 A1 | 3/2006 | Simske |
| 2006/0136508 A1 | 6/2006 | Idicula et al. |
| 2006/0143340 A1 | 6/2006 | Labar |
| 2006/0167912 A1 | 7/2006 | Coulson et al. |
| 2006/0168513 A1 | 7/2006 | Coulson et al. |
| 2006/0195783 A1 | 8/2006 | Davis et al. |
| 2006/0212467 A1 | 9/2006 | Murphy et al. |
| 2006/0242559 A1 | 10/2006 | Krantz et al. |
| 2006/0277179 A1 | 12/2006 | Bailey |
| 2007/0044012 A1 | 2/2007 | Suver et al. |
| 2007/0067461 A1 | 3/2007 | Savchenko et al. |
| 2007/0079234 A1 | 4/2007 | McCollum et al. |
| 2007/0143330 A1 | 6/2007 | Tang |
| 2007/0256061 A1 | 11/2007 | Victorov |
| 2007/0271305 A1 | 11/2007 | Chandrasekar et al. |
| 2008/0077606 A1 | 3/2008 | Fang et al. |
| 2008/0098001 A1 | 4/2008 | Gupta et al. |
| 2008/0098019 A1 | 4/2008 | Sthanikam et al. |
| 2008/0098020 A1 | 4/2008 | Gupta et al. |
| 2008/0098186 A1 | 4/2008 | Zhou |
| 2008/0104025 A1 | 5/2008 | Dharamashi et al. |
| 2008/0195933 A1 | 8/2008 | McKellar et al. |
| 2008/0294676 A1 | 11/2008 | Faerber et al. |
| 2009/0063952 A1 | 3/2009 | Raghavachari et al. |
| 2009/0094236 A1 | 4/2009 | Renkes et al. |
| 2009/0112890 A1 | 4/2009 | Medi et al. |
| 2009/0112902 A1 | 4/2009 | Sthanikam et al. |
| 2009/0141629 A1 | 6/2009 | Gerosa et al. |
| 2009/0150412 A1 | 6/2009 | Idicula et al. |
| 2009/0248648 A1 | 10/2009 | Johnson et al. |
| 2009/0287670 A1 | 11/2009 | Hou et al. |
| 2009/0287719 A1 | 11/2009 | Warner et al. |
| 2010/0205198 A1 | 8/2010 | Mishne |
| 2010/0235725 A1 | 9/2010 | Drayton et al. |
| 2011/0179088 A1 | 7/2011 | Medi et al. |
| 2012/0109910 A1 | 5/2012 | Netz et al. |
| 2013/0018853 A1 | 1/2013 | Jayaraman et al. |
| 2013/0060780 A1 | 3/2013 | Lahinri et al. |

OTHER PUBLICATIONS

Oracle Corporation, "What is Reduced XML?," Publicly presented as early as Jul. 8, 2003, 4 pages.

Jinyu Wang and Mark Scardina, "XML Data Streaming for Enterprise Applications Using PL/SQL and SAX," Apr. 3, 2002, 11 pages.

Deepak Vohra, "Validating XML Documents Against XML Schema," Feb. 4, 2004, http://otn.oracle.com/pub/articles/vohra_xmlschema.html?_template+/otn/content/.

W3C, "XQuery 1.0 and XPath 2.0 Data Model," Nov. 12, 2003, http://www.w3.org/TR/2003/WD-expath-datamodel-20031112/, retrieved Jun. 22, 2004, pp. 1-72.

W3C, "XML Schema Part 1: Structures," May 2, 2001, http://www.w3org./TR/2001/REC-xmlschema-1-20010502/, retrieved Jun. 22, 2004, pp. 1-186.

Zhang et al., "Binary XML Storage and Query Processing in Oracle 11g", Proc. VLDB Endow. 2,2, dated Aug. 2009, pp. 1354-1365.

U.S. Appl. No. 11/437,512, filed May 18, 2006, Final Office Action, Mar. 1, 2013.

U.S. Appl. No. 13/224,327, filed Sep. 2, 2011, Office Action, Mar. 14, 2013.

Ozden, Mustafa, "A Binary Encoding for Efficient XML Processing", Dec. 17, 2002, pp. 81-102.

Ozden, Mustafa, "A Binary Encoding for Efficient XML Processing", Dec. 17, 2002, 114 pages.

"WD97: How Word for Windows Uses Temporary Files" dated Nov. 16, 2006, downloaded from the Internet on Jan. 28, 2011, <http://support.microsoft.com/kb/89247> 6 pages.

Balmin et al., "Incremental Validation of XML Documents", ACM Trans. Database System, Dec. 24, 2004, 42 pages.

Bayardo et al., "Optimizing encoding: An evaluation of binary XML encoding optimizations for fast stream based XML process- (56) References Cited

OTHER PUBLICATIONS ing", May 2004, Proceedings of the 13th International Conference on World Wide Web WWW 04, Publisher ACM press, pp. 345-354.

Bouchou et al., "Updates and Incremental Validation of XML Documents", LNCS 2921, 2004, pp. 216-232.

Catania et al., Lazy XML Updates: Laziness as a Virtue of Update and Structural Join Efficiency, SIGMOD 2005 Jun. 14-16, 2005, pp. 515-526.

Kanne et al., "Efficient Storage of XML data", Dec. 13, 1999, pp. 1-22.

Kim et al., "An Efficient XML Index Technique with Relative Position Coordinates", Dept. of Computer Science, Seoul, South Korea, WSEAS Transaction on Information Science and Applications, vol. 2, No. 4, Apr. 2005, pp. 373-379.

La Fontaine et al., "A delta Format for XML: Identifying Changes in XML Files and Representing the Changes in XML", 2001, 26 pages.

Liefke et al., "Xmill: An efficient compressor for XML data", May 2000, ACM SIGMOD Record, Proceedings of the 2000 ACM SIGMOD international conference on Management of data SIGMOD 00', vol. 29, Issue 2, Publisher: ACM Press, pp. 153-164.

Liu et al., "Configurable indexing and ranking for XML information retrieval", Jul. 2004, Proceedings of the 27th annual international ACM SIGIR conference on Research and Development in information retrieval SIGIR 04, Published by ACM Press. pp. 88-95.

Min et al., "XML Indexing and compression: XPRESS: a queriable compression for XML data", Jun. 2003, Proceedings of the 2003 ACM SIGMOD international conference on Management of data SIGMOD 03, Published by ACM Press, pp. 122-133.

PCT/US2007/010163, Notification of Transmittal of the International Search Report and Written Opinion of the International Searching Authority, Oct. 12, 2007, 12 pages.

"WAP Binary XML Content Format" downloaded from the Internet Nov. 9, 2007 <http://www.w3.org/TR/wbxm/> 15 pages.

"What's New in the XDK?" downloaded from the Internet Nov. 9, 2007 <http://download.oracle.com/docs/cd/B28359_01/appdev.111/b28394/whatsnew.htm > 3 pages.

Wong, "The Extended XQL for Querying and Updating Large XML Databases", DocEng '07, Nov. 9-10, 2001, pp. 95-104.

Yu et al., "Dynamically updating XML Data: Numbering Scheme Revisited", Internet and Web Information Systems, 8, 2005, pp. 5-26.

Zou et al., "XML Processing: Ctree:a compact tree for indexing XML data", Nov. 2004, Proceedings of the 6th annual international workshop on Web information and data management WIDM '04, Published by ACM Press, pp. 39-46.

"3 Using Oracle XML DB" downloaded from the Internet Nov. 9, 2007 <http://download.oracle.com/docs/cd/B28359_01/appdev.111/b28369/xdb03usg.htm> 63 pages.

"4 XML Parsing for Java" downloaded from the Internet Nov. 9, 2007 <http://download.oracle.com/docs/cd/B28359_01/appdev.111/b28394/adx_j_parser.htm> 42 pages.

"4 XMLType Operations" downloaded from the Internet Nov. 9, 2007 <http://download.oracle.com/docs/cd/B28359_01/appdev.111/b28369/xdb04cre.htm> 29 pages.

"20 Using the XML Schema Processor for C" downloaded from the Internet Nov. 9, 2007 <http://download.oracle.com/docs/cd/B28359_01/appdev.111/b28394/adx_c_sproc.htm> 10 pages.

Zhang et al., "TDX: A High Perfomrance Table-driven XML Parser", In proceedings of the 44th annual (ACM) Southeast Regional Conference, Mar. 2006, ACM, pp. 726-731.

U.S. Appl. No. 11/437,512, filed May 18, 2006.

U.S. Appl. No. 11/437,512, filed May 18, 2006, Office Action, Aug. 5, 2009.

U.S. Appl. No. 11/437,512, filed May 18, 2006, Office Action, Mar. 16, 2010.

U.S. Appl. No. 11/437,512, filed May 18, 2006, Office Action, Oct. 4, 2010.

U.S. Appl. No. 11/437,512, filed May 18, 2006, Office Action, Mar. 28, 2011.

U.S. Appl. No. 11/437,512, filed May 18, 2006, Office Action, Nov. 1, 2012.

Kanne et al., "Efficient Storage of XML Data", dated Jun. 16, 1999, 20 pages.

U.S. Appl. No. 13/224,327, filed Sep. 2, 2011, Final Office Action, Nov. 4, 2015.

U.S. Appl. No. 11/437,512, filed May 18, 2006, Office Action, Oct. 14, 2015.

Myer, "A Really, Really Good Introduciton to XML", Sitepoint, dated Aug. 24, 2005, 107 pages.

Kangasharju et al., "Xebu: A Binary Format with Schema-Based Optimzations for XML Data", dated Nov. 20-22, dated 2005, pp. 528-535.

Ewald, Arnold, "1.9. Using the WAP Binary XML Parser", dated Dec. 27, 2005, the Ulxmlrpcpp Handbook, p. 1 through table of content, 3 pages.

U.S. Appl. No. 11/427,512, filed May 18, 2006, Notice of Allowance, May 17, 2016.

U.S. Appl. No. 11/437,512, filed May 18, 2006, Interview Summary, Feb. 25, 2016.

U.S. Appl. No. 13/224,327, filed Sep. 2, 2011, Office Action, Nov. 1, 2016.

U.S. Appl. No. 11/437,512, filed May 18, 2006, Office Action, May 22, 2014.

U.S. Appl. No. 13/224,327, Filed Sep. 2, 2011, Office Action, Mar. 3, 2015.

U.S. Appl. No. 11/437,512, Filed May 18, 2006, Advisory Action, Jan. 28, 2015.

U.S. Appl. No. 13/224,327, filed Sep. 2, 2011, Final Office Action, Nov. 6, 2013.

U.S. Appl. No. 13/631,434, filed Sep. 28, 2012, Notice of Allowance, Nov. 20, 2013.

U.S. Appl. No. 13/631,434, filed Sep. 28, 2012, Notice of Allowance, Mar. 20, 2014.

U.S. Appl. No. 11/437,512, filed May 18, 2006, Final Office Action, Oct. 3, 2014.

EFFICIENT VALIDATION OF BINARY XML DATA

CROSS-REFERENCE TO RELATED APPLICATIONS; BENEFIT CLAIM

The present application is continuation of U.S. patent application Ser. No. 12/689,196, entitled Efficient Validation of Binary XML Data, filed Jan. 18, 2010 by Vijay Medi, et al., the contents of which are incorporated herein by reference.

The present application is related to U.S. patent application Ser. No. 10/798,474, entitled Techniques For Streaming Validation-Based XML Processing Directions, filed Mar. 10, 2004 by Mark Vincent Scardina, et al., the contents of which are incorporated herein by reference.

FIELD OF THE INVENTION

The present invention relates to technology for storing XML data.

BACKGROUND

The Extensible Markup Language (XML) is the standard for data and documents that is finding wide acceptance in the computer industry. XML describes and provides structure to a body of data, such as a file or data packet, referred to herein as a XML entity. The XML standard provides for tags that delimit sections of a XML entity referred to as XML elements. Each XML element may contain one or more name-value pairs referred to as attributes.

By defining an element that contains attributes and descendant elements, the XML entity defines a hierarchical tree relationship between the element, its descendant elements, and its attribute. A set of elements that have such a hierarchical tree relationship is referred to herein as a XML document.

A XML schema document is a document that defines a schema for XML documents, that is, describes and constrains the contents and structure of XML documents. The description of the constraints and structure of a XML document is referred to as a XML document schema. A XML schema document may be written in a definition language for defining XML document schema. One such example is XML Schema. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 Oct. 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation 28 Oct. 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation 28 Oct. 2004, located at "http://www.w3.org/TR/xmlschema-2/", the entire contents of which are hereby incorporated by reference for all purposes as if fully set forth herein.

A XML document that conforms to a XML document schema may be referred to herein as either as an instance of the XML document schema and as in instance of the respective XML document schema.

An XML document schema may define parts of the XML document schema, e.g. an element or complex elements, and may define element or complex types. Each of these may be referred as an XML schema constructs or just simply schema. The XML document schema may also be referred to herein as a XML schema.

A XML document schema is used to validate XML documents. As used herein, validation refers to the process of determining whether a portion of a XML document (such as, for example, an entire XML document, a XML element included in a XML document, a sub-element of a XML element, or an attribute of a XML element) conforms to the definition and constraints specified in the relevant portion of a XML document schema. The validation of a specific portion of a XML document may return a validation result which, depending on the particular implementation, may comprise one or more values that indicate a successful or a failed validation outcome. In addition, the validation result may also comprise an overall validation outcome for a particular portion of a XML document that includes one or more sub-portions (e.g. for a XML element that includes sub-elements).

Validation is often performed whenever a XML document is loaded for storage in a repository that stores XML documents. Such repositories may store multitudes of XML documents that purport to be instances of any number of XML document schemas. When a new XML document is added to the repository, validation may be performed. Clearly, there is a need to perform the XML validation in an efficient way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are techniques for caching the structures generated to validate a XML document to a particular schema. The structures are cached within a shared volatile memory (which may be referred to hereafter as "shared memory"). Once the structures are cached, the cached structures may be used to validate other XML documents without the need to regenerate the structures. A XML schema may be defined by the declarations contained in multiple XML schema documents; some or all of the documents may declare constructs not defined for the XML schema. In approaches referred to herein as selective caching, only structures needed to perform validation for an XML document are generated and stored in the shared memory cache.

Repository

Validation of XML documents is an important task performed by a repository that stores XML documents. A XML repository is a computer system that stores and manages access to XML documents. Specifically, a XML repository is a combination of integrated software components and an allocation of computational resources, such as memory, disk storage, a computer, and processes on the node for executing the integrated software components on a processor, the combination of the software and computational resources being dedicated to managing storage and access to stored XML documents.

A repository is typically part of a n-tier system, where the repository is in the first tier and one or more applications are in the outer tier. The clients (e.g. processes executing applications) of the repository and (hereafter referred to as users) interact with a repository by establishing a connection. Often, but not necessarily, a client and repository are located on different computers; the connection to the repository includes a network connection to the repository.

The repository is a multi-user computer system. As a multi-user computer system, the repository establishes a user session for each user. A session is a particular connection established for a client to a multi-user system, through which the client issues a series of requests (e.g., requests to store a XML document, query a collection of XML documents). The multi-user system maintains session state data. The session state data reflects the current state of operations requested via the session and may contain the identity of the client for which the session is established, connection details, such as network address of the network device executing the user's client process, statistics about resource usage for the session, temporary variable values generated by processes executing software within the session.

According to an embodiment, a repository comprises a database server that has been configured to store XML documents. In a database server, a XML document may be stored in a row of a table and nodes of the XML document are stored in separate columns or attributes in the row. A XML document may be stored in multiple tables. An entire XML document may also be stored in a lob (large object) in a column. A XML document may also be stored as a hierarchy of objects in a database; each object is an instance of an object class and stores one or more elements of a XML document.

Binary-encoded XML is another form of storing XML data in a database. Binary-encoded XML is a compact binary representation of XML that was designed to reduce the size of XML documents. One of the ways binary-encoded XML compresses data is by representing strings ("tokens") with fixed values.

Tables and/or objects of a database system that hold XML data are referred to herein collectively as base data structures and individually as base tables or base database objects. As used herein, the term "database representation" or "database model" refers to the combination of any base structures that are used to store data for XML documents of a particular schema and/or category (including XML documents that do not conform to a schema), and any indexes on the base structures. Different examples of base structures that a database might support for storing XML include, but are not limited to, object relational storage (O-R), LOB, CLOB (Character LOB), BLOB (Binary LOB), CSX, and binary.

The term XML document also refers to a representation of the XML document. The representation itself may not conform to XML. For example, a binary encoded body of data representing a XML document may not itself conform to XML. The body of data may contain tokens in lieu of XML text tags. Nevertheless, the body of data is treated as a representation of the XML document and may be referred to herein as a XML document.

Database Server Implementation

In an embodiment, the repository is a XML enabled database system, and includes at least one database server. The database server validates XML documents when loading the documents into a database.

Figure 1:
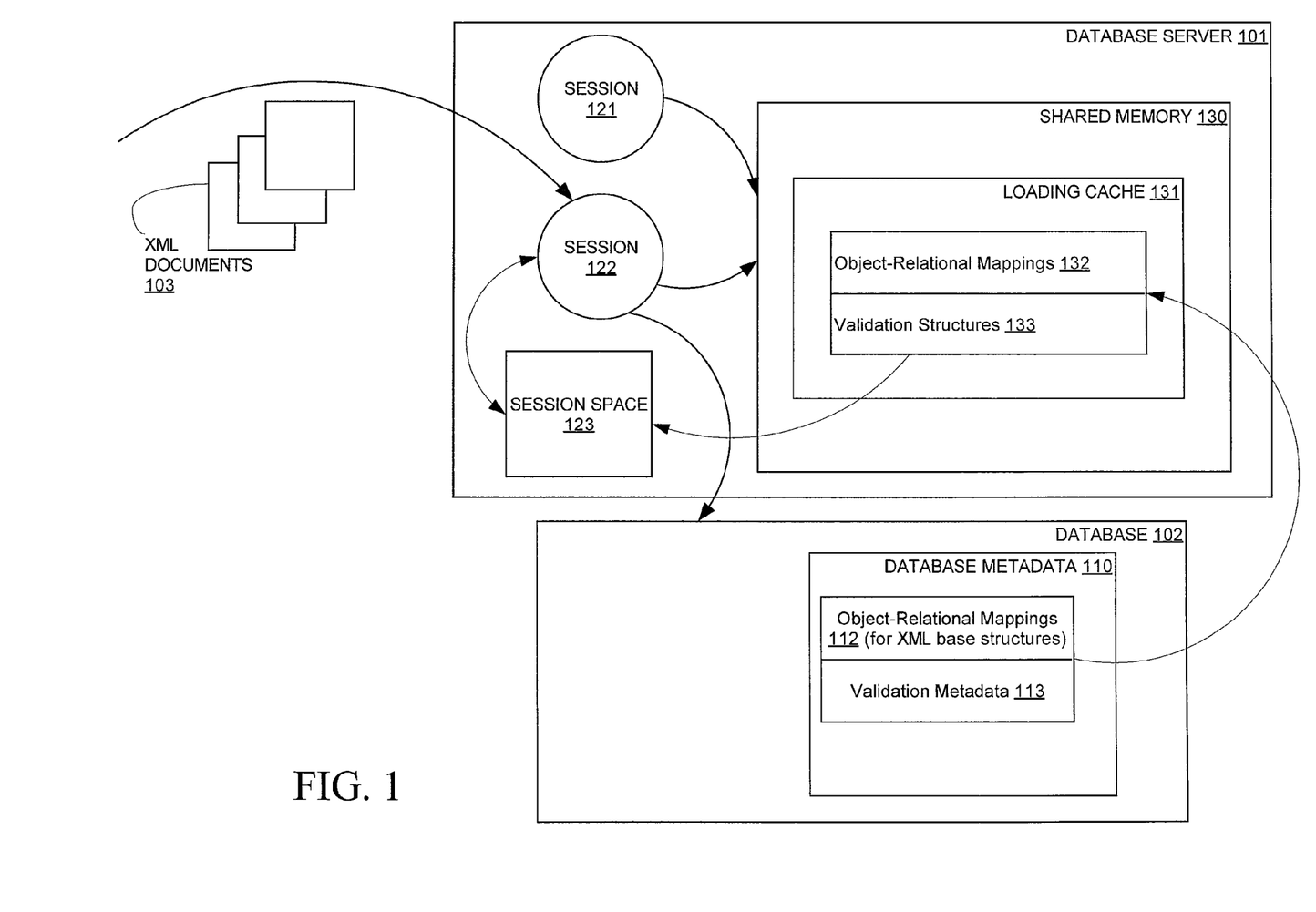
FIG. 1 is a diagram that depicts a database system enabled as a repository for XML documents according to an embodiment of the present invention.

Referring to FIG. 1, depicted therein is a XML enabled database management system 100. Database management system 100 includes database server 101, which manages database 102. Database 102 includes database metadata 110, which includes metadata data that defines database objects within database 102. Database metadata defines, among other things, tables, columns, views, triggers, and other structures for supporting storage and access of XML documents, as described further herein. Database 102 includes base tables and database objects for storing XML documents.

Database management system 100 loads XML documents and stores them within database 102. Loading refers to the operations performed to receive a XML document and store the XML document in the database in the base structures. Loading may, but not necessarily, include validation.

Loading a XML document uses various forms of database metadata. Among such forms are object-relational mappings 112, that map elements of a XML schema to base structures used to store instances of the XML schema.

Another form of database metadata used is validation metadata 113. Validation metadata 113 includes metadata that describes XML schemas and is used during validation to determine whether a XML document conforms to the XML schema.

Some forms of loading and/or storage of XML documents depend on the schema validity of a XML document, that is, whether it conforms to a XML schema. For example, encoding and decoding schemes for encoding binary encoded XML documents assume that the XML document being encoded conforms to a XML schema.

Database server 101 is a multi-user system. Multiple users may establish concurrent sessions, such as database session 121 and 122. Separate concurrently running operating system processes may be executing within session 121 and 122, respectively.

In-Memory Validation Structures

According to an embodiment, in-memory validation structures (hereafter "validation structures") are cached in a shared memory 130. The term shared memory or volatile memory, includes virtual forms of volatile memory that use a combination of volatile and non-volatile memory to emulate volatile memory. Validation structures comprise code/instructions and associated data that are stored in memory and that can be used to validate multiple XML documents. A validation structure might only be used to validate a portion of a XML document with XML schema construct. For example, a validation structure might only be used to validate a portion of a XML document that corresponds to a grouping (e.g. sequence) or to a user-defined complex type defined by a XML document schema.

A shared memory, such as shared memory 130, is an allotment of memory that is accessible, for both read and write operations, by multiple operating system processes. Thus, separate processes, executing within separate database sessions, may concurrently access shared memory 130. Shared memory access entails more overhead than accessing, for example, private memory area of a process that cannot be accessed by other processes. Such overhead includes synchronizing access, which entails use of locking mechanisms (e.g. latch, semaphore, or lock mechanisms) to manage concurrent access to shared memory by multiple process.

According to an embodiment of the present invention, validation structures, referred to as cached validation structures are stored in loading cache 131, shared memory that has been apportioned to caching validation metadata used for loading the XML documents. Loading cache 131 may also be used to cache object relational mappings 132.

To validate a particular XML document, the validation structures stored in loading cache 131 may be loaded/copied into memory areas used by a process validating the XML document. For example, an XML document may be validated by session 122. Validation structures needed to validate the XML document may be copied from loading cache 131 to session space 123, which is private memory allocated to the process of the session 122.

Cashed Static Information and Runtime Information

According to an embodiment, validation structures comprise several types of information or data: (1) compile-time static data and (2) runtime data. The first kind of data is referred as compile-time static data because the data is used for validation to an XML document schema, can be generated when respective XML schema document is registered with the repository, and does not change when used to validate a XML document. In fact, compile-time static data need not change when used to validate multiple XML documents. However, runtime data does change during validation. According to an embodiment of the present information, validation structures that hold compile-time static data are stored in loading cache 131 as cached validation structures, while validation structures holding runtime information is not.

For example, a validation structure may be used to validate a complex type with descendents, e.g. elements and attributes. Compile-time static data in a validation structure defines the descendants and ordering between them. Information keeping track of which descendants occurred in an XML document being validated is runtime data.

Compile-time static data may define constraints that require counting during validation, while runtime data structures store counting information generated during validation. For example, compile-time static data may define occurrence constraints that require counting during validation. Runtime structures are used to store counts generated during validation.

In an embodiment of the present invention, elements within an XML document may be validated using a finite state machine. Finite state machines are used to validate a XML document, or portion thereof, that is streamed and encoded in binary form, such as described in U.S. patent application Ser. No. 10/798,474, Techniques For Streaming Validation-Based XML Processing Directions. The state machine may comprise compile-time static data and runtime data that is used to validate the XML document during validation. Similarly, there are many other schema structures, such as identity-constraints, patterns, etc., that may comprise separate compile-time structures and runtime structures.

Active Schema List

A XML document that references a XML document schema may not actually contain constructs for all XML schema constructs of the XML document schema. The set of XML schema constructs that are or should be contained in a particular XML document being validated is referred to herein as the active schema list.

The active schema list may vary from XML document to XML document. As such, the active schema list is treated as runtime data and is not stored in loading cache 131.

The number of members in the list may be much smaller than the XML constructs defined by a XML document. To validate a XML document, only the validation structures needed to validate the members of the active schema list are needed.

To conserve resources, and to validate XML documents more efficiently, the active schema list of an XML document is determined and any not found in loading cache 131 are loaded into the loading cache 131. The active schema list may be determined by, for example, examining the XS: type attributes of elements in an XML document.

Validating Documents Using Selective Caching

Figure 2:
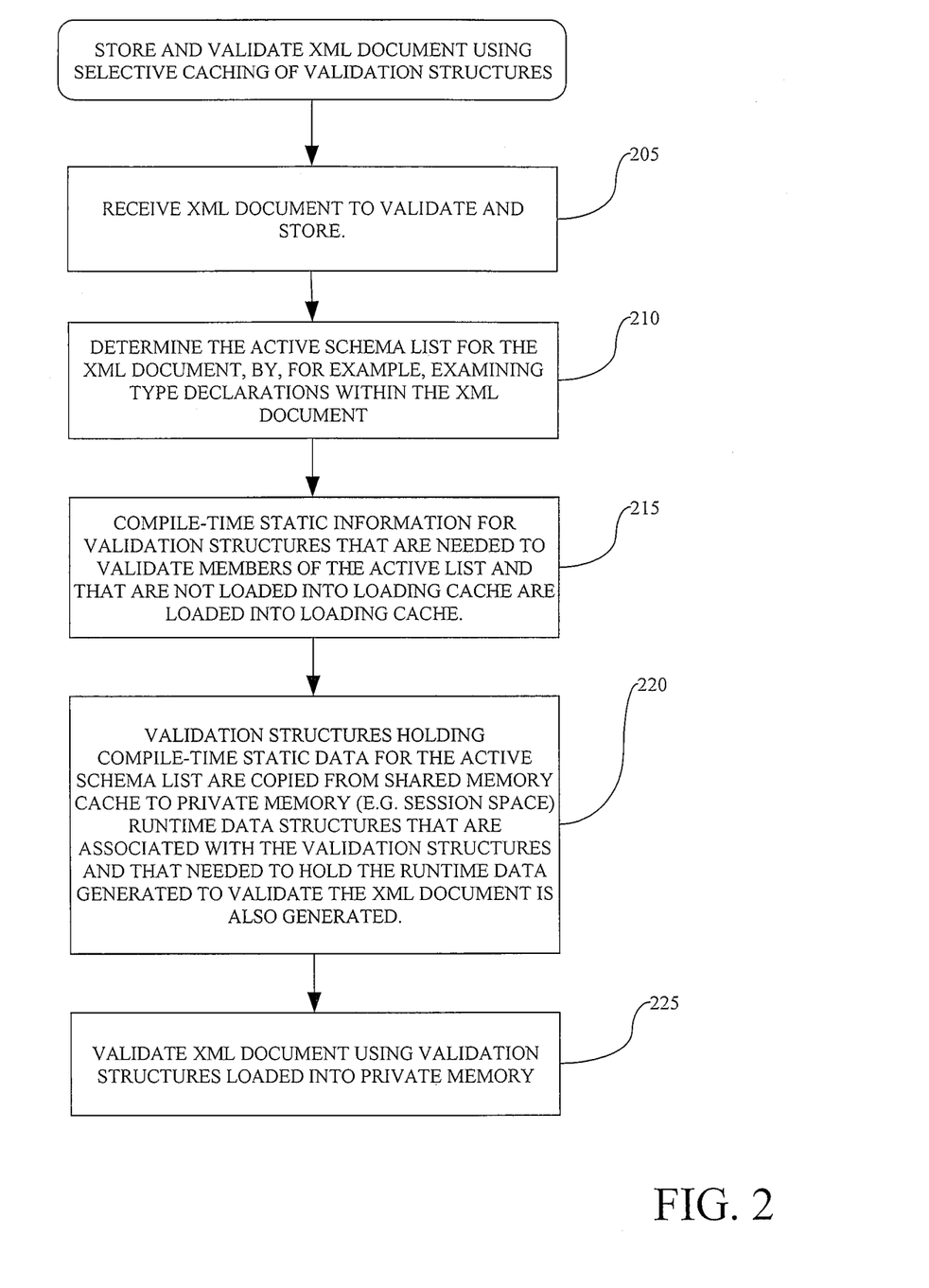
FIG. 2 is a diagram that depicts a procedure that uses selective caching of validation structures according to an embodiment of the present invention.

FIG. 2 is a flow chart depicting a procedure performed to validate a XML document using selective caching. The procedure is illustrated using the repository depicted in FIG. 1.

Referring to FIG. 1, at 205, database server 101 receives within session 122 a XML document to validate and store.

At 210, database server 101 determines the active schema list for the XML document. This is determined by, for example, examining type declarations within the XML document, such as xmlns:xsi schema attribute declarations and the xsi: attribute of elements in the XML document.

At step 215, compile-time static information for validation structures that are needed to validate members of the active list and that are not loaded into loading cache 131 are loaded into loading cache 131. Loading compile-time static information may entail simply copying validation structures stored persistently in validation metadata 113, or may entail generating validation structures derived from validation metadata 113.

At 220, validation structures holding compile-time static data for the active schema list are copied from cache 131 to session space 123. Runtime data structures that are associated with the validation structures and this needed to hold the runtime data generated to validate the XML document is also generated within session space 123.

At step 225, the received XML document is validated using the validation structures loaded into session space 123.

Subsequently, if other XML documents need to be validated, and a validation structure needed to validate a XML document is still cached in loading cache, then the overhead of reading validation metadata 113 and generating validation structures is avoided. When multiple XML documents are validated that have similar or identical schemas, the chances of cache hit in loading cache 131 for the needed validation structures is improved. Further, only storing the validation structures of XML schema constructs that actually exist in the XML documents being validated further improves the chances of a cache hit.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
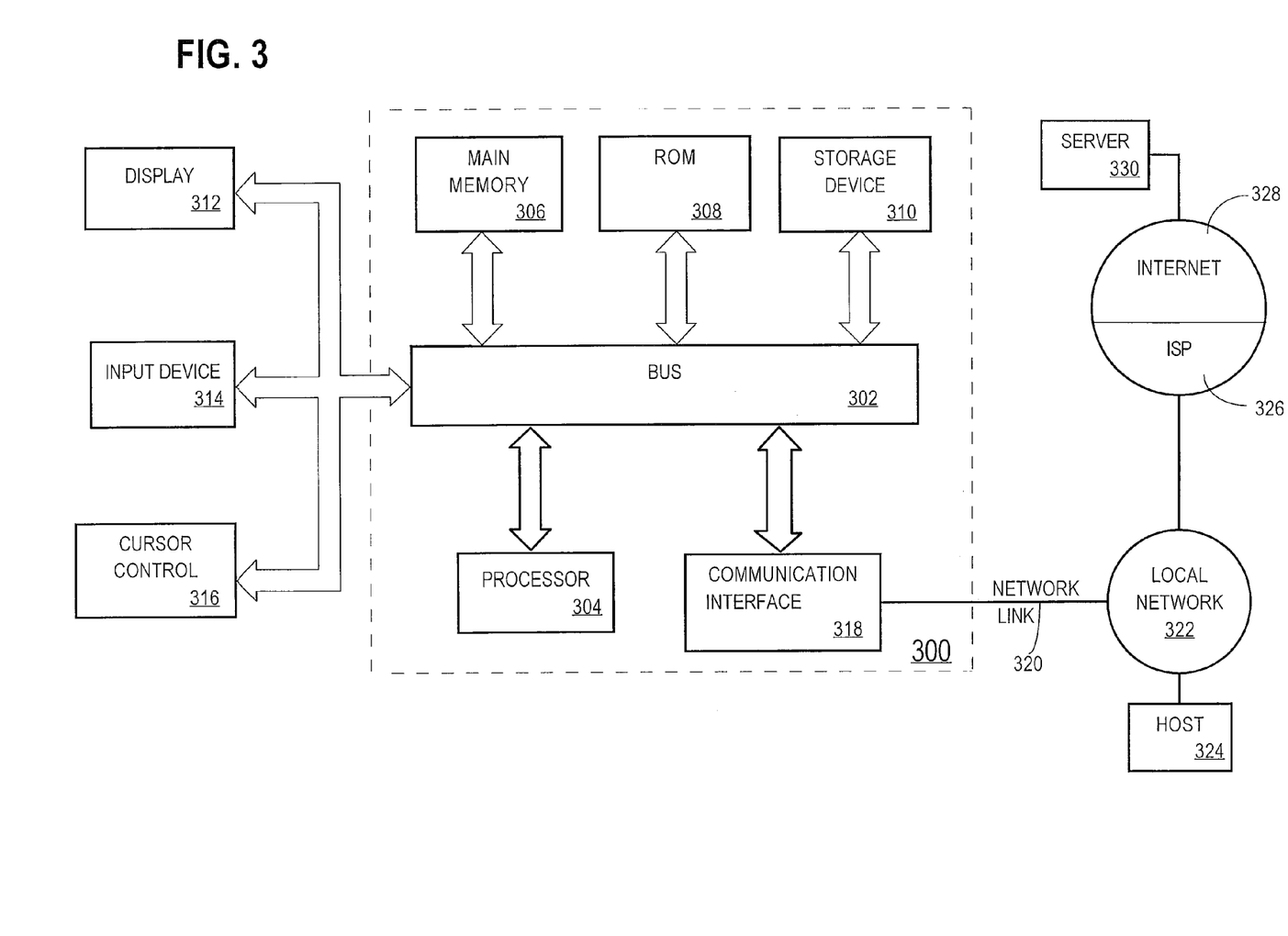
FIG. 3 is a diagram of a computer system that may be used to implement an embodiment of the present invention.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
a repository receiving a first request to store a XML, document;
wherein a first process within a first session is running within said repository;
wherein a second process within a second session is running within said repository;
in response to receiving said first request, said first process validating said XML document based on a XML schema defined by one or more XML schema documents, wherein validating said XML document includes said first process storing, in a shared volatile memory, compile-time generated static structures comprising validation data and specifically generated for XML document validation based on said XML schema, wherein said XML schema is registered with said repository;
said repository receiving a subsequent request to store one or more XML documents associated with said XML schema;
in response to receiving said subsequent request, said second process subsequently validating said one or more XML documents based on said XML schema;
wherein subsequently validating said one or more XML document comprises:
said second process copying from said shared volatile memory said compile-time generated static structures into private memory that is private to said second process, and
said second process using said compile-time generated static structures that are stored in said private memory to validate said one or more XML documents; and
wherein the method is performed by one or more computing devices of said repository.

2. The method of claim 1,
wherein said one or more XML, schema documents define a set of constructs that include more constructs than exist in said XML document;
wherein validating said XML document includes:
making a determination of which constructs of said set of constructs should exist in said XML document; and
generating validation structures based on said determination of which constructs should exist in said XML document.

3. The method of claim 2, wherein generating validation structures based on said determination of which constructs should exist in said XML schema includes examining type declarations within said XML document.

4. The method of claim 1, wherein generating validation structures includes dynamically creating a validation structure within said shared volatile memory, wherein a copy of a version of said validation structure is not stored in persistent storage before dynamically creating said validation structure.

5. The method of claim 3, wherein the validation structures include a finite state machine generated based on examining said one or more XML schema documents.

6. A non-transitory computer-readable medium storing instructions which, when executed by one or more processors, cause:
a repository receiving a first request to store a XML document;
wherein a first process within a first session is running within said repository;
wherein a second process within a second session is running within said repository;
in response to receiving said first request, said first process validating said XML document based on a XML schema defined by one or more XML schema documents, wherein validating said XML document includes said first process storing, in a shared volatile memory, a compile-time generated static structures comprising validation data and specifically generated for XML document validation based on said XML schema, wherein said XML schema is registered with said repository;
said repository receiving a subsequent request to store one or more XML documents associated with said XML schema;
in response to receiving said subsequent request, said second process subsequently validating said one or more XML documents based on said XML schema;
wherein subsequently validating said one or more XML document comprises:
said second process copying from said shared volatile memory said compile-time generated static structures into private memory that is private to said second process, and said second process using said compile-time generated static structures that are stored in said private memory to validate said one or more XML documents.

7. The non-transitory computer-readable medium of claim 6,
wherein said one or more XML schema documents define a set of constructs that include more constructs than exist in said XML document;
wherein validating said XML document includes:
making a determination of which constructs of said set of constructs should exist in said XML document; and
generating validation structures based on said determination of which constructs should exist in said XML document.

8. The non-transitory computer-readable medium of claim 7, wherein generating validation structures based on said determination of which constructs should exist in said XML schema includes examining type declarations within said XML document.

9. The non-transitory computer-readable medium of claim 6, wherein generating validation structures includes dynamically creating a validation structure within said shared volatile memory, wherein a copy of a version of said validation structure is not stored in persistent storage before dynamically creating said validation structure.

10. The non-transitory computer-readable medium of claim 8, wherein the validation structures include a finite state machine generated based on examining said one or more XML schema documents.

* * * * *